(12) United States Patent
Chrupalla et al.

(10) Patent No.: US 10,960,327 B2
(45) Date of Patent: Mar. 30, 2021

(54) FILTER ELEMENT AND FILTER COMPRISING AT LEAST TWO FILTER ELEMENTS

(71) Applicants: ALFA LAVAL CORPORATE AB, Lund (SE); ALFA LAVAL MOATTI SAS, Elancourt (FR)

(72) Inventors: Jean-Claude Chrupalla, Vauréal (FR); Guillaume Estachy, Meudon (FR)

(73) Assignees: ALFA LAVAL CORPORATE AB, Lund (SE); ALFA LAVAL MOATTI SAS, Elancourt (FR)

( * ) Notice: Subject to any disclaimer, the term of this patent is extended or adjusted under 35 U.S.C. 154(b) by 245 days.

(21) Appl. No.: 16/061,629

(22) PCT Filed: Jan. 26, 2017

(86) PCT No.: PCT/EP2017/051685
§ 371 (c)(1),
(2) Date: Jun. 12, 2018

(87) PCT Pub. No.: WO2017/129701
PCT Pub. Date: Aug. 3, 2017

(65) Prior Publication Data
US 2018/0369722 A1 Dec. 27, 2018

(30) Foreign Application Priority Data

Jan. 28, 2016 (EP) .................................... 16305082

(51) Int. Cl.
*B01D 25/26* (2006.01)
(52) U.S. Cl.
CPC ...... *B01D 25/26* (2013.01); *B01D 2201/0423* (2013.01)

(58) Field of Classification Search
CPC ...... B01D 25/26; B01D 29/39; B01D 29/413; B01D 2201/0423
See application file for complete search history.

(56) References Cited

U.S. PATENT DOCUMENTS 1,812,725 A * 6/1931 Stanley .................. B01D 29/39
140/109
2,088,199 A 7/1937 Gleason
(Continued)

FOREIGN PATENT DOCUMENTS

CA 2 333 569 A1 12/1999
CA 2333569 A1 * 12/1999 ............. B01D 25/26
(Continued)

OTHER PUBLICATIONS

JP47009395Y—Machine Translation (Year: 2020).*
(Continued)

*Primary Examiner* — Patrick Orme
(74) *Attorney, Agent, or Firm* — Birch, Stewart, Kolasch & Birch, LLP

(57) ABSTRACT

The filter element of a filter has an internal face, an external face, a filtering mesh, two concentric circular inner and outer edges between which the filtering mesh extends, and radial ribs provided on the internal face. The radial ribs extend between the concentric edges and are distributed circumferentially in order to form sectors on the internal face. The filter element is configured to be assembled against a corresponding filter element so that the internal face faces the corresponding filter element. At least some of the sectors have a reinforcing rib connecting a radial rib to the outer edge, the reinforcing rib having a portion that is inclined, when viewed in the radial plane, with respect to the radial rib and to the outer edge.

18 Claims, 8 Drawing Sheets

(56) References Cited

U.S. PATENT DOCUMENTS

| | | | |
|---|---|---|---|
| 2,592,527 A | 4/1952 | Armstrong | |
| 2,592,849 A | 4/1952 | Balley | |
| 2,720,983 A | 10/1955 | Kracklauer | |
| 3,079,001 A | 2/1963 | May | |
| 4,880,537 A | 11/1989 | Drori | |
| 2013/0161252 A1* | 6/2013 | Chrupalla | B01D 25/26 210/411 |

FOREIGN PATENT DOCUMENTS

| | | |
|---|---|---|
| CH | 386 989 | 1/1955 |
| EP | 1 091 791 B1 | 2/2003 |
| GB | 512972 | 9/1939 |
| GB | 722472 | 1/1955 |
| JP | 47-9395 U | 4/1972 |
| JP | 47009395 Y1 * | 4/1972 |
| JP | 47-32221 U | 9/1972 |
| JP | 2002-517305 A | 6/2002 |
| JP | 2013-538681 A | 10/2013 |
| KR | 10-2013-0108334 A | 10/2013 |
| RU | 2166351 C1 | 5/2001 |
| WO | WO 99/64132 A1 | 12/1999 |
| WO | WO 2012/028824 A1 | 3/2012 |

OTHER PUBLICATIONS

Russian Notice of Allowance, dated Mar. 21, 2019, for Russian Application No. 2018130846/05.

Korean Office Action for Korean Application No. 10-2018-7024363, dated Feb. 17, 2020, with an English translation.

Japanese Office Action, dated Aug. 19, 2019, for Japanese Application No. 2018-558486.

International Search Report, issued in PCT/EP2017/051885, dated May 8, 2017.

Written Opinion of the International Searching Authority, issued in PCT/EP2017/051685, dated May 8, 2017.

\* cited by examiner

FILTER ELEMENT AND FILTER COMPRISING AT LEAST TWO FILTER ELEMENTS

TECHNICAL FIELD

The invention relates to a filter element having a filtering mesh extending between two concentric circular edges, to a pair of such filter elements arranged one against the other and to a filter comprising a plurality of such filter elements, stacked along an axis. More particularly, the invention relates to an improvement of filter element.

BACKGROUND

The European patent published under the number 1 091 791 describes a filter structure using annular flat filter elements, each having an internal face, an external face, and a filtering mesh. The filtering mesh is annular and extends between two concentric circular edges, respectively an inner edge and an outer edge. Radial ribs that are regularly distributed circumferentially and that extend in axial correspondence on opposite sides of the filtering mesh between said concentric edges serve to form sectors on the internal face and on the external face. Such filter elements are designed to be assembled against each other in such a manner that their facing internal faces define a space that is compartmented circumferentially by the contacting radial ribs of said internal faces. For each sector, passages are arranged in the inner and outer edges. By stacking a selected number of filter element pairs, a desired filter area is obtained for an intended application. Typically, the fluid to be filtered penetrates into the stack via passages situated in the inner edge, passes through the filtering meshes, and, once purified, exits via the passages defined in the outer edge. Naturally, the flow of fluid between the filtering meshes could be reversed or arranged in some other way.

There is a constant demand for larger flows through the filter elements. However, increasing the size of the filter elements increases the pressure drop to an unacceptable level and weakens the filter element. Besides, increasing the filter element height or the number of filter elements would lead to excessively high and heavy filters.

Therefore, there is a need for a new type of filters.

SUMMARY OF THE INVENTION

In this respect, the present disclosure relates to a filter element having an internal face, an external face, a filtering mesh, two concentric circular edges, respectively an inner edge and an outer edge between which said filtering mesh extends, and radial ribs provided at least on the internal face, said radial ribs extending between said concentric edges and being distributed circumferentially in order to form sectors on said internal face, said filter element being configured to be assembled against a corresponding filter element so that said internal face faces said corresponding filter element and said radial ribs delimiting the sectors act to circumferentially form compartments in a space between said internal face and said corresponding filter element, said inner edge having passages respectively communicating with corresponding ones of the sectors. At least some of the sectors, preferably most of the sectors or all of the sectors, are each provided with at least one reinforcing rib connecting a radial rib to the outer edge, and said reinforcing rib has an inclined portion that, when viewed in a radial plane, forms a non-zero angle with respect to the radial rib and with respect to the outer edge.

The concentric circular edges are circular about a central axis, hereafter referred to as defining an axial direction. The radial ribs are optionally regularly distributed circumferentially in order to form the sectors on said internal face. A radial direction is a direction perpendicular to the central axis and intersecting the central axis. An axial plane is a plane including the central axis. A radial plane is a plane perpendicular to the central axis. A circumference is a circle included in a radial plane and having its center on the central axis. A tangential or circumferential direction is a direction which is at a tangent to a circumference. It is perpendicular to the central axis but does not intersect the central axis. A corresponding filter element, as referred to herein, may be a filter element substantially similar or identical to the filter element, or a filter element of a non-similar but complementary shape, and, in particular, having a filtering mesh extending between concentric inner and outer edges. Such corresponding filter element possibly has radial ribs intended to come into contact with the radial ribs of the internal face of the filter element so as to define the compartments, when the filter element and the corresponding filter element are assembled.

Thus, the radial ribs are ribs that extend in a radial direction.

Since the outer edge is circular about the central axis, the plane in which the outer edge extends is a radial plane.

Thanks to this filter element arrangement, the filtering mesh surface available for filtering is increased as compared with prior art devices, as the size of the filter element can be increased and the reinforcing ribs may be smaller in size and require less material than the radial ribs. The pressure loss is reduced due to the increase in the available filtering mesh surface. This filter element is therefore suitable for being used in filters for processing greater fluid flows. Also, this arrangement makes it possible to design a filter element having similar mechanical strength as a filter element of the prior art (that is: without reinforcing ribs) while being made of material having intrinsically a lower mechanical strength. Specifically, the filtering mesh can be less resistant per se while, due to the reinforcing ribs, achieving the expected mechanical strength. Similarly, the ribs, including the radial ribs and/or the reinforcing ribs, may be made of a material such as a polymer, although it is of course still possible to use a more conventional material for making ribs on filter elements, such as aluminium.

In some embodiments, a distance between the radial rib and the inclined portion of the reinforcing rib, measured in the circumferential direction, increases towards the outer edge.

In some embodiments, when viewed in the radial plane in which the outer edge extends, the inclined portion and the radial rib form an angle greater than 5°, preferably greater than 10°, preferably greater than 15°, and/or less than 85°, preferably less than 70°, preferably less than 60°.

Thus, when viewed in the radial plane in which the outer edge extends, the inclined portion and the radial rib may form an angle from 5° to 85°, preferably from 10° to 70°, preferably from 15° to 60°.

In some embodiments, when viewed in the radial plane in which the outer edge extends, the inclined portion and the radial rib form an angle of about 30°, e.g. 30°+/−10°.

In some embodiments, the inclined portion is rectilinear. In case the inclined portion is not rectilinear, the angle is preferably measured between the radial rib and the tangent to the inclined portion at the intersection of the radial rib and the inclined portion.

In some embodiments, the reinforcing rib comprises a connecting portion connecting the two consecutive radial ribs delimiting the sector in which said reinforcing rib is formed, said connecting portion having two branches, each connected to one of said two consecutive radial ribs at a connection zone, said branches joining up at a joining zone.

Such connecting portion having two branches, has been found by the inventors to be easy to manufacture, while providing an efficient reinforcement over a large sector of filtering mesh.

Optionally, the connection zones are radially closer to the inner edge than the joining zone.

Thus, the branches open towards the inner edge, that is, in general, towards the incoming flow of fluid to be filtered. This enhances distribution of the flow over the filtering mesh.

Optionally, the connecting portion has the general shape of a V or a U. This shape has been found by the inventors to optimize manufacturing processes, e.g. a manufacturing process by injection molding. A better injection prevents cold fronts during the molding process, therefore reducing the rejected portions and improving the mechanical state of the filter element.

The connecting portion may include the above-mentioned inclined portion. More precisely, the branches of the connecting portions may form such above-mentioned inclined portions.

In some embodiments, the reinforcing rib has the general shape of a Y. For instance, the upper part of the Y may be formed by the connecting portion having the form of a V, possibly with the inclined branches of the V facing the flow of fluid to be filtered. This shape has been found by the inventors to optimize mechanical properties and decrease pressure losses of the filter element.

In some embodiments, the reinforcing rib comprises a first and a second connecting portion, each having two branches each connected to one of said two consecutive radial ribs, and two radial portions, the first radial portion extending between the outer edge and the joining zone of the branches of the first connecting portions, and the second radial portion extending between said joining zone of the branches of the first connecting portion and the joining zone of the branches of the second connecting portion.

In some embodiments, the reinforcing rib is connected to the outer edge next to one of the passages in the circumferential direction. This eases the flow of the fluid towards the outlet passages and thus decreases pressure losses.

In some embodiments, the reinforcing ribs extending on either sides of one of the radial ribs are connected to said one radial rib at different locations in the radial direction. The stresses in the radial rib are thus distributed over different locations. In addition, when two filter elements are assembled against each other, the reinforcing ribs of the respective filter elements are at least partly shifted from one another, which leaves more room for the fluid to flow and decreases pressure losses of the filter elements.

In some embodiments, the filtering mesh has a conical shape. This decreases the pressure loss and enables to strengthen the connection between the edges and the filtering mesh in the vicinity of the passages. Thus, greater flows can be filtered through the filter.

In some embodiments, the filtering mesh is secured to the inner edge at a location situated between 40% and 60% of the axial thickness of the inner edge at a passage. This provides better mechanical resistance of the connection between the filtering mesh and the inner edge. Thus, the flow rates in the filter element can be increased without damaging the filter element. This increases the maximum output of the filter element.

In some embodiments, the filtering mesh is secured to the outer edge at a location situated between 40% and 60% of the axial thickness of the outer edge at a passage. This provides better mechanical resistance of the connection between the filtering mesh and the outer edge. Thus, the flow rates in the filter element can be increased without damaging the filter element. This increases the maximum output of the filter element.

In some embodiments, said reinforcing rib divides the filtering mesh surface of the sector in substantially equal areas. In the present disclosure, substantially equal areas are areas which differ from each other by not more than 50%. In those embodiments, the stresses in the filtering mesh are thus balanced between all areas.

In some embodiments, the ratio of the filtering mesh surface available for filtering to the total filtering mesh surface is at least 70%, preferably at least 75%. The special arrangement of the reinforcing ribs enables to increase the ratio of the filtering mesh surface available for filtering to the total filtering mesh surface, so as to improve efficiency of the filter element.

In some embodiments, the diameter of the outer edge may be about 300 millimeters. The reinforcing ribs as previously described are particularly advantageous for large filter elements, for which they significantly increase the mechanical strength of the filter elements.

In some embodiments, radial ribs are further provided on the external face, said radial ribs extending between said concentric edges and being regularly distributed circumferentially in order to form sectors on said external face, and wherein the radial ribs on the internal face are in axial correspondence with the radial ribs on the external face.

In some embodiments, the radial ribs and/or the reinforcing rib are made of polymer.

In embodiments, a number of filter elements are arranged to be stacked together to form a stack of filter elements. To facilitate this stacking, the filter elements may be provided with a plurality of holes, respectively, for positioning and aligning the filter elements. The holes are adapted for mounting assembly rods, such as threaded rods. The holes may preferably be located near the outer radial edge each filter element, although other, radially more central locations may also be contemplated. Also, the holes may be provided in a number of said radial ribs. Then, the filter element would suitably include a number of radial ribs without holes and a number of radial ribs provided with said holes. Alternatively, the holes are provided between said radial ribs. Furthermore, male and female bushings, respectively, may be arranged around these holes for indexing two adjacent filter elements in relation to each other.

In further embodiments encompassing filter elements provided with holes, one or more of the reinforcing ribs of the filter element may be connected between a radial rib and an adjacent radial rib, provided with a hole. Thus, in these embodiments, one or more of the reinforcing ribs would not be connected to the outer edge of the filter element. Then, the radially outer end of the reinforcing rib could be connected at the vicinity of the hole, e.g. at the radial position thereof, to said radial rib comprising a hole. This embodiment may be advantageous for filter elements of smaller diameter.

As mentioned, providing the reinforcing ribs increases the mechanical strength of the filter element and reinforces the filtering mesh. In some applications, especially with finer mesh openings, conventional filter elements have a supporting mesh against which the filtering mesh is arranged, thus forming a double or triple-layer mesh structure. Such supporting mesh have a much higher mesh opening than the filtering mesh, but offers higher resistance to stresses. This is because a filtering mesh having a small mesh opening may not per se present the required mechanical strength. The supporting mesh is more resistant to stresses and provides the required mechanical strength. Providing the reinforcing ribs according to the present disclosure, could make it possible to dispense from such supporting mesh in certain embodiments. In the meaning of the present disclosure, the "mesh opening" is the largest diametrical dimension of an elementary aperture of the filtering mesh, measured in the plane in which said elementary mesh extends.

BRIEF DESCRIPTION OF THE DRAWINGS

The invention and advantages thereof will be better understood upon reading the detailed description which follows, of embodiments of the invention given as non-limiting examples. This description refers to the appended drawings, wherein.

DETAILED DESCRIPTION OF EMBODIMENTS

An embodiment of a filter 100 comprising a filter element 10 is described with reference to FIGS. 1-6.

Figure 1:
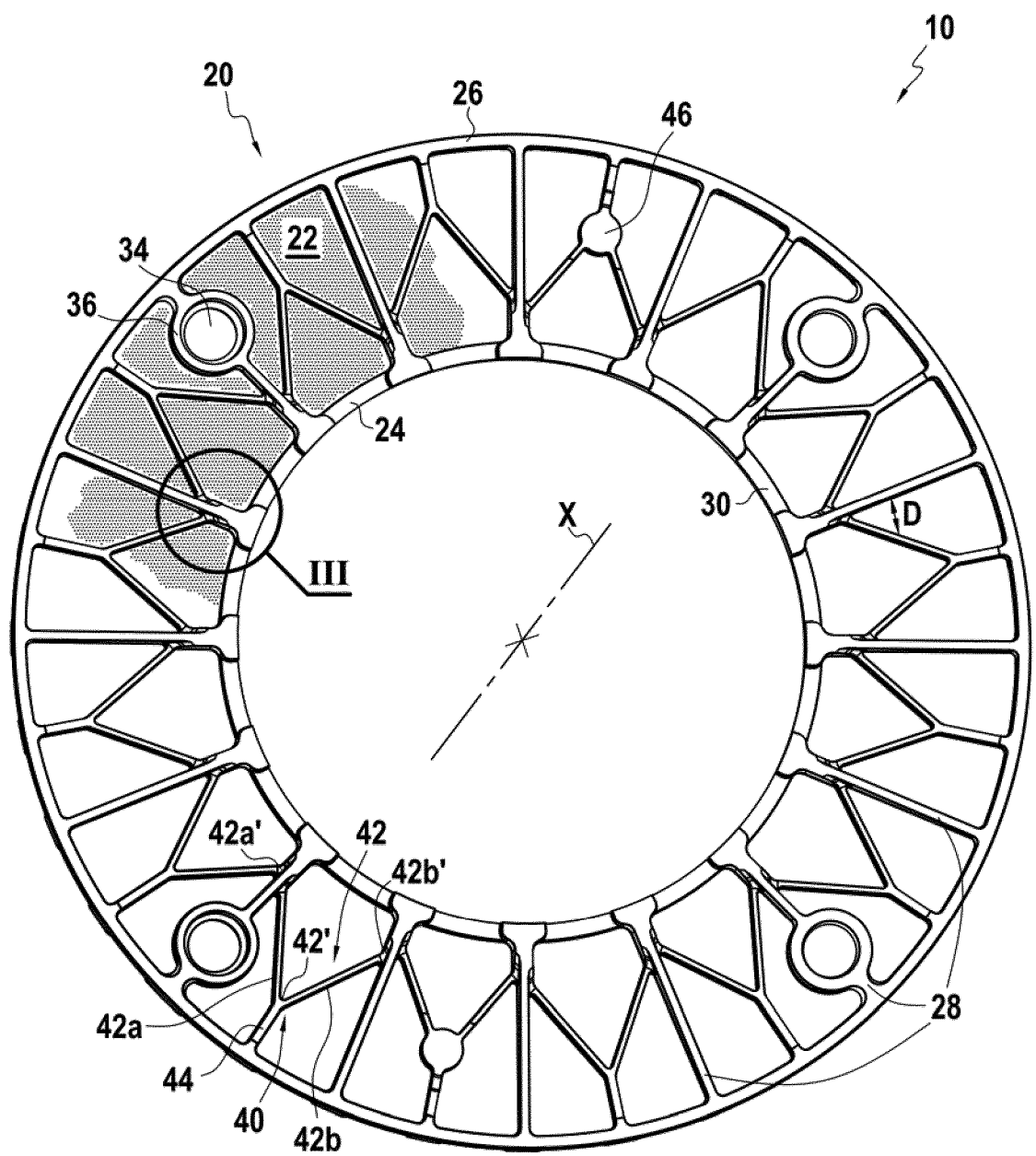
FIG. 1 illustrates a perspective view of the internal face of a filter element according to an embodiment.
Figure 2:
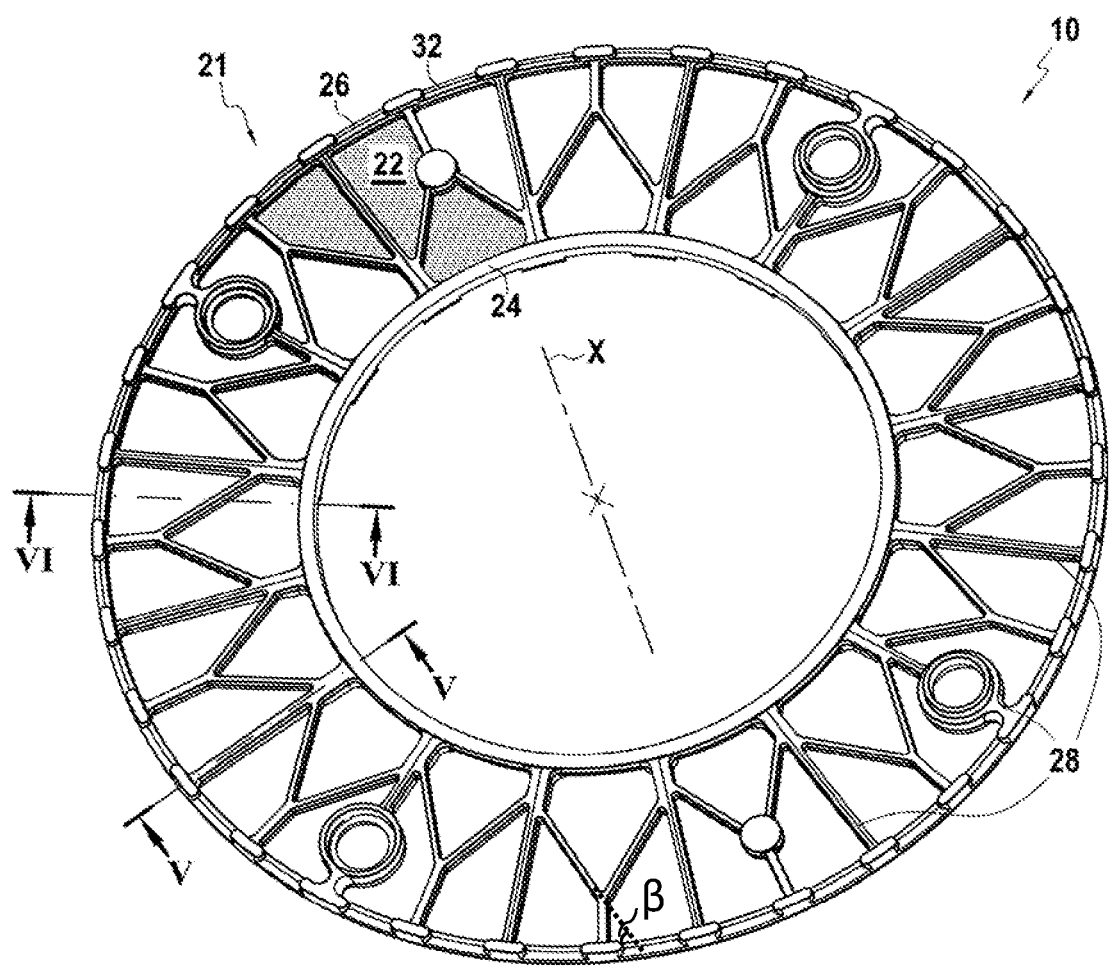
FIG. 2 illustrates a perspective view of the external face of the filter element of FIG. 1.

A filter element 10 according to an embodiment represented in FIGS. 1 and 2 has an internal face 20, an external face 21, a filtering mesh 22, two concentric circular edges, respectively an inner edge 24 and an outer edge 26 between which said filtering mesh 22 extends. The concentric circular edges 24, 26 are circular about a central axis X, hereafter referred to as defining an axial direction. The inner edge 24 mainly extends in a plane which is perpendicular to the axial direction X, i.e. a radial plane. The outer edge 26 mainly extends in a plane which is perpendicular to the axial direction X, i.e. a radial plane.

In this embodiment, the diameter of the outer edge 26 is about 300 mm. Of course, other diameters are possible, including, for example diameters in the range from about 100 mm to about 600 mm.

The filter element 10 comprises radial ribs 28 provided at least on the internal face 20. In this embodiment, as shown in FIG. 2, radial ribs 28 are provided on the external face 21 too. Thus, if three similar filter elements 10 are stacked, both faces of filter element in the middle of the stack face the respective internal faces of the two other filter elements, and the radial ribs provided on these respective faces interact to form compartments.

The radial ribs 28 extend between the inner edge 24 and the outer edge 26, in the radial direction. The radial ribs 28 are regularly distributed circumferentially in order to form sectors on said internal face 20, as shown in FIG. 1. In this embodiment, further radial ribs 28 are regularly distributed circumferentially in order to form sectors on said external face 21, as shown in FIG. 2. The radial ribs 28 on the internal face 20 and on the external face 21 face one another on opposite sides of the filtering mesh 22. In other words, the radial ribs 28 on the internal face 20 and on the external face 21 are in axial correspondence with one another.

The inner edge 24 has passages 30 respectively communicating with corresponding ones of the sectors. The passages 30 are provided as notches or cutouts in the inner edge 24. The passages 30 are provided between consecutive radial ribs 28. The passages 30 are provided on the internal face 20.

As shown in FIG. 2, the outer edge 26 has passages 32 respectively communicating with corresponding ones of the sectors. The passages 32 are provided as notches or cutouts in the outer edge 26. The passages 32 are provided between consecutive radial ribs 28. The passages 32 are provided on the external face 20.

Holes 34 for passing assembly rods, typically threaded rods, are defined in the vicinity of the outer edge 26 of each filter element, and they are formed by molding the same material that defines the circular edges 24, 26 and the radial ribs 28. Male and female bushings 36 are arranged around these holes 34, e.g. in a radial rib 28, for indexing two filter elements 10 relative to each other.

In the non-limiting example shown, each filter element 10 is divided into sixteen sectors and has four holes 34 with bushings regularly spaced apart circumferentially. Depending in particular on its diametrical size, the filter element can have less or more sectors. For example, a filter element having an outer diameter of 100 to 150 mm may have 8 to 12 sectors, and a filter element having an outer diameter of 500 to 600 mm may have 20 to 24 sectors.

The filter elements 10 may be manufactured by molding around the filtering mesh 22. In other words, they may be manufactured by injection molding or similar, wherein the filtering mesh forms an insert in the mold. The molded portions may be made of metal (e.g. an aluminum alloy) or of plastics material, especially polymers. The radial ribs 28 and the inner and outer edges 24, 26 may be coated in elastomer in order to avoid leaks between filter elements 10.

For instance, liquid to be filtered, e.g. oil or water, can enter the filter 100 through a passage 30 of the inner edge 24 of a filter element 10, cross the filtering mesh 22 to pass from the internal face 20 to the external face 21, whereby the liquid is filtered, and flow out of the filter element 10 through a passage 32 of the outer edge 26. The opposite flow direction is possible as well.

As previously mentioned, each one of the sectors is provided with at least one reinforcing rib 40 connecting a radial rib 28 to the outer edge 26. Said reinforcing rib 40 has a portion that is inclined, when viewed in the radial plane in which the outer edge 26 extends, with respect to the radial rib 28 and to the outer edge 26.

In this embodiment, the reinforcing rib 40 has first and second inclined portions 42a, 42b and a radial portion 44. The first and second inclined portions 42a, 42b are respectively connected to the radial ribs 28 defining the sector, and to the radial portion 44. The radial portion 44 is connected to the outer edge 26. The radial portion 44 extends in the radial direction.

In the following, only the first inclined portion 42a will be described. Unless specified otherwise, the second inclined portion 42b may have all or part of the features of the first inclined portion 42a. In this embodiment, the first and second inclined portions 42a, 42b are symmetric about the radial portion 44 to which they are connected. Alternatively, the first and second inclined portions may be asymmetrical about such radial portion.

As shown in FIG. 2, reinforcing ribs 40 are also provided on the external face 21. The reinforcing ribs 40 on the internal face 20 and on the external face 21 face one another on opposite sides of the filtering mesh 22 so as to decrease pressure losses. Features detailed hereafter as to the first inclined portion 42a on the internal face 20 may apply to the inclined portions on the external face 21.

The first inclined portion 42a is rectilinear but it could also be curved, provided that it includes a portion that is inclined, when viewed in the plane in which the outer edge 26 extends, with respect to the radial rib 28 and to the outer edge 26.

As illustrated in FIGS. 1 and 2, a distance D between the radial rib 28 and the first inclined portion 42a of the reinforcing rib 40, measured in the circumferential direction, increases towards the outer edge 26. The first inclined portion 42a and the radial rib 28 to which it is connected form an acute angle which opens towards the outer edge 26.

In this embodiment, the radial portion 44 of the reinforcing rib 40 is rectilinear. Note that, even though a rectilinear radial portion is preferred, other alternatives are also possible. The radial portion 44 and the first inclined portion 42a are connected so as to form an obtuse angle.

Figure 3:
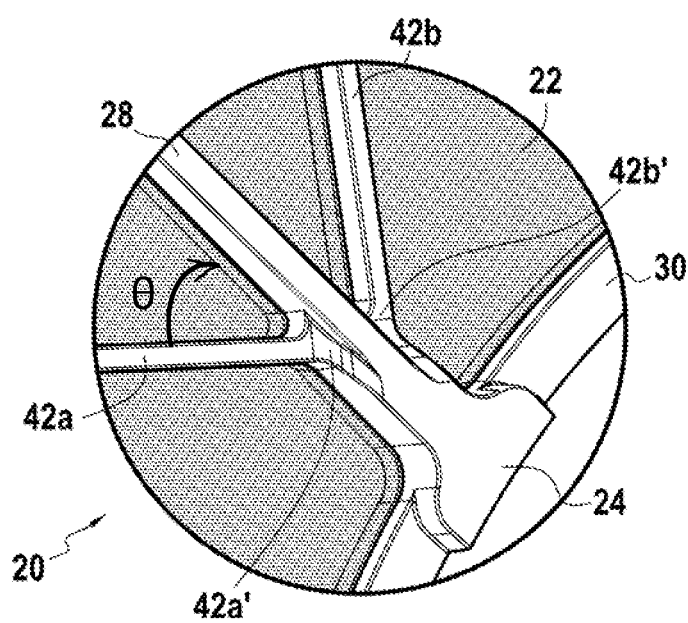
FIG. 3 is a detailed perspective view of area III in FIG. 1.

When viewed in the plane in which the outer edge extends, the inclined portion and the radial rib form an angle θ from 5° to 85°. In the present embodiment, the angle θ is about 30° as shown in FIG. 3.

The first and second inclined portions 42a, 42b are connected to each other so as to form a connecting portion 42 connecting the two consecutive radial ribs 28 between which the sector is formed. Actually, the first and second inclined portions 42a, 42b form respective branches of the connecting portion 42, each branch being connected to a radial rib 28 at a connection zone (respectively 42a' and 42b') and the two branches joining up at the joining zone 42' where they are also connected to the radial portion 44. In this embodiment, said connecting portion 42 has the general shape of a V.

Considering the radial portion 44 of the reinforcing rib 40, in this embodiment, the reinforcing rib has the general form of a Y. The two inclined branches of the Y are formed by the first and second inclined portions 42a, 42b forming the connecting portion 42.

The branches of the V or the Y open towards the inner edge 24, that is, in most cases, in the direction from which the flow of fluid comes to the sector. In fact, the connection zones 42a' and 42b' are radially closer to the inner edge 24 than the joining zone 42'.

Figure 8:
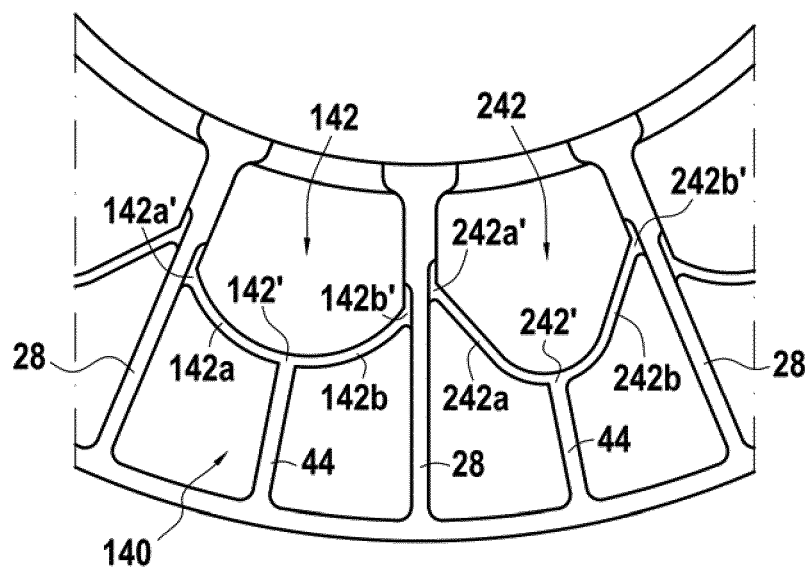
FIG. 8 is a partial perspective view of a filter element according to a third embodiment.

The connecting portion formed by the first and second inclined portions may have a shape other than a V, for example a U shape. This is shown in FIG. 8, in which the filter element may have one or more connecting portions 142, having first and second inclined portions 142a and 142b, which are curved from their joining zone 142' to their respective connection zones 142a' and 142b'. This figure also shows the filter element having first and second inclined portions 242a and 242b, having rectilinear parts close to their connection zones 242a' and 242b', but having curved parts close to their joining zone 242'. In both cases, the connecting portion has a concave shape, of which the concavity is turned towards the inner edge, from which the flow of fluid normally comes.

As illustrated in FIG. 2, the radial portion 44 of the reinforcing rib 40 is connected to the outer edge 26 next to one of the passages 32 in the circumferential direction. In this embodiment, each sector comprises two passages 32 in the outer edge 26. The radial portion 44 may be connected to the outer edge 26 between said two passages 32. However, each sector may comprise only one passage 32 in the outer edge 26, or more than two passages 32.

The reinforcing rib 40 may comprise an enlarged portion 46, e.g. at the intersection of the radial portion 44 and the first and second inclined portions 42a, 42b. The enlarged portion 46 may be used for labeling purposes.

As shown in FIGS. 1 and 2, the reinforcing rib 40 divides the filtering mesh surface of the sector in substantially equal areas.

FIG. 3 shows a detail of FIG. 1. Although the reinforcing ribs may for some embodiments be connected to the radial ribs at similar radial locations, i.e. at a similar distance from the axial center of the filter element, in the embodiment shown in FIG. 3, the reinforcing ribs 40 extending on either sides of one of the radial ribs 28 are connected to said one radial rib 28 at different locations in the radial direction. More specifically, FIG. 3 shows a radial rib 28 compartmenting two adjacent sectors on the internal face 20. A first inclined portion 42a of one of the sectors and a second inclined portion 42b of the other one of the sectors are connected to the radial rib 28. The first inclined portion 42a and the second inclined portion 42b are connected to the radial rib 28 at different locations in the radial direction. Here, a connection zone 42a' between the first inclined portion 42a and the radial rib 28 is closer to the outer edge 26 and farther from the inner edge 24 than a connection zone 42b' between the second inclined portion 42b and the radial rib 28. This facilitates the injection molding of the filter element 10, enhances its mechanical strength and provides advantages regarding fluid flow, which will be detailed hereafter with reference to FIGS. 4A and 4B.

Figure 4A:
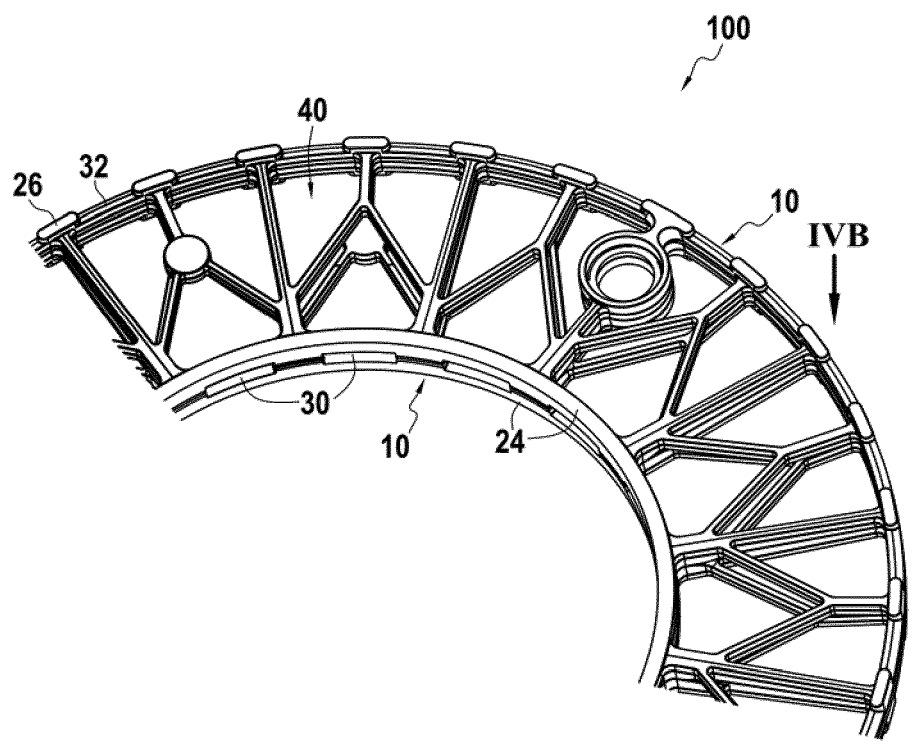
FIG. 4A is a partial perspective view of a filter comprising two filter elements stacked one on the other.
Figure 4B:
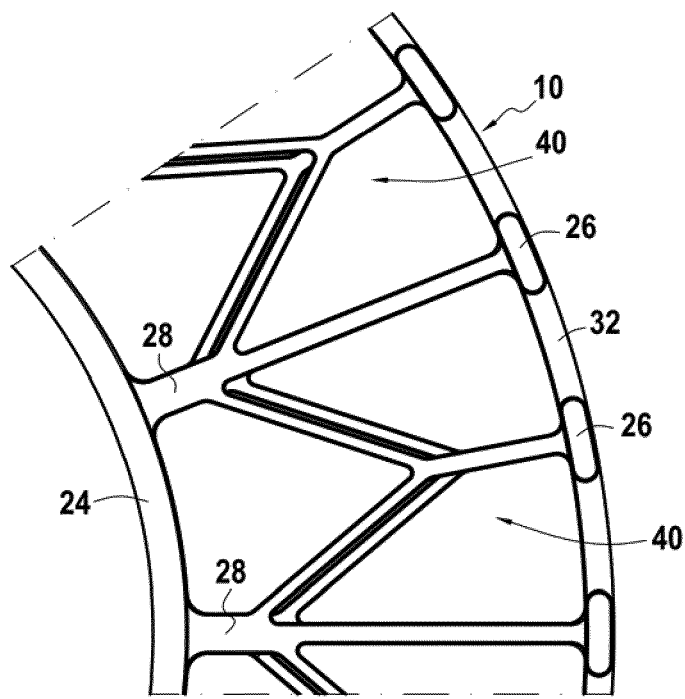
FIG. 4B is a partial top view of FIG. 4A.

As illustrated in FIGS. 4A and 4B, the filter elements 10 are configured to be assembled against each other so that their respective internal faces 20 face each other so as to define a space between them. Said space is circumferentially compartmented by the contacting radial ribs 28 of said internal faces. On the other hand, the radial ribs 28 provided on the external face 21 do not have to contact one another. Compartmenting sectors on the side of the filtering mesh 22 on which non-filtered liquid is introduced enables de-clogging the filtering mesh 22 by backwashing, as is known per se in the art.

A filter 100 is made by assembling together at least two filter elements 10, as shown in FIG. 4A. To obtain a filter of desired filter capacity, it suffices to stack and assemble together a desired number of individual filters 100 like the filter shown in FIG. 4A.

As detailed previously with reference to FIG. 3, the reinforcing ribs 40 extending on either sides of one of the radial ribs 28 are connected to said one radial rib 28 at different locations in the radial direction. Thanks to this feature, when two filter elements 10 are assembled against each other so that their respective internal faces 20 face each other, the reinforcing ribs 40 of the respective filter elements 10 do not entirely face each other in the axial direction. That is, when two filter elements 10 are assembled against each other so that their respective internal faces 20 face each other, the reinforcing ribs 40 of facing sectors of the respective filter elements 10 are shifted with respect to each other in a radial plane. This shift is particularly visible in FIG. 4B. Thus, the reinforcing ribs of the adjacent filter elements may have at least parts which do not overlap axially, which facilitates the flow of fluid.

In addition, every second sector, the radial length of the radial portion 44 of a reinforcing rib 40 may be longer than the radial length of the radial portion 44 of the reinforcing rib 40 of the adjacent sector (see e.g. FIG. 1). Thus, when two filter elements 10 are assembled against each other so that their respective internal faces 20 face each other, a shorter radial portion 44 axially faces a longer radial portion 44.

Those features facilitate the flow of the liquid to be filtered and decrease pressure losses.

More generally, the reinforcing ribs 40 help the filtering mesh 22 withstand the pressure of the fluid to be filtered. An optimal arrangement of the reinforcing ribs 40 enables to increase the fluid flow through the filter. The reinforcing ribs 40 contribute to stiffening the filter element 10.

Figure 5:
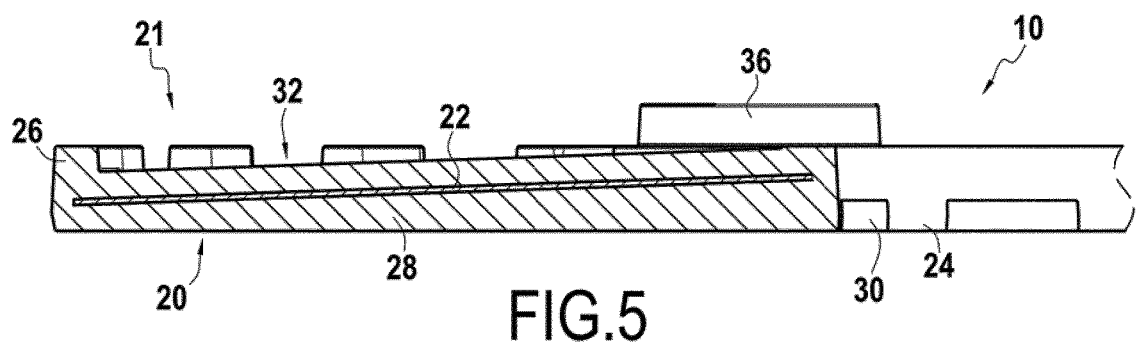
FIG. 5 is a partial section view of a filter element in plane V-V of FIG. 2.

FIG. 5 is a partial section view of the filter element 10 in plane V-V of FIG. 2, i.e. through a radial rib 28 of the filter element 10. The internal face 20 and the external face 21 are separated by the filtering mesh 22. As can be seen in FIG. 5, the thickness of the radial rib 28, in the axial direction, is constant on the external face 21. The thickness of the radial rib 28, in the axial direction, decreases from the inner edge 24 to the outer edge 26, on the external face 21. Thus, when several filter elements 10 are assembled with one another as previously described, adjacent sectors communicate with each other on the external face side, while they are compartmented with each other on the internal face side.

The inner edge 24 and the outer edge 26 are axially limited by two parallel radial planes.

As shown in FIG. 5, the filtering mesh 22 has a conical shape, or frustoconical shape, about the axial direction X of the filter element 10. An advantage thereof will be explained with reference to FIG. 6, which is a partial section view of the filter element 10 in plane VI-VI of FIG. 2, i.e. through a passage 30 of the inner edge 24 and a passage 32 of the outer edge 26.

As shown in FIG. 3, on the internal face 20, a thickness of the reinforcing rib 40, measured in the axial direction, is less than a thickness of the radial rib 28. The thickness of the connection zones 42a', 42b' of the first and second inclined portions 42a, 42b, decreases from the thickness of the radial rib 28. Besides the connection zone 42a' (resp. 42b'), the thickness of the first inclined portion 42a (resp. second inclined portion 42b) is constant.

Figure 6:
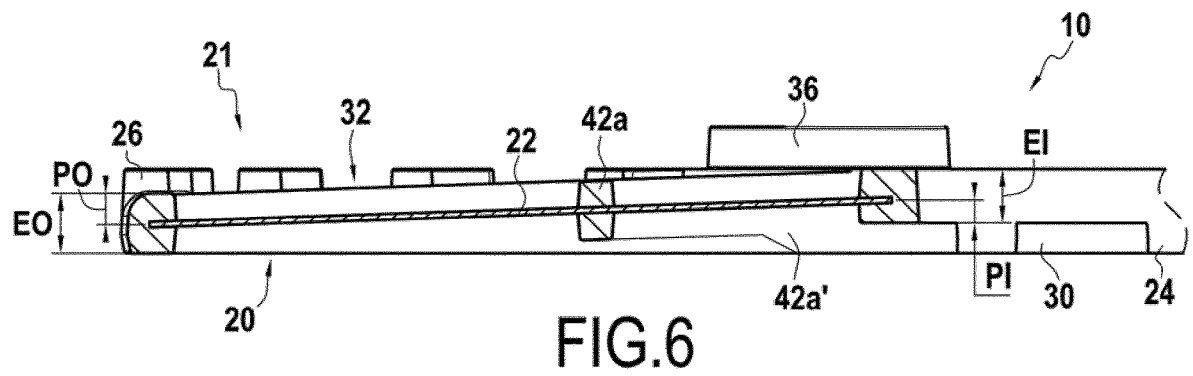
FIG. 6 is a partial section view of a filter element in plane VI-VI of FIG. 2.

On the other hand, FIG. 6 shows that on the external face 21, a thickness of the reinforcing rib 40 (from which only the first inclined portion 42a is illustrated in FIG. 6), measured in the axial direction, is equal to a thickness of the radial rib 28.

In FIG. 6, reference sign EI stands for the axial thickness of the inner edge 24 at a passage 30, reference sign EO stands for the axial thickness of the outer edge 26 at a passage 32, reference sign PI stands for the axial distance between the end portion of the filtering mesh 22 which is the closest to the central axis X and the closest edge of the passage 30 of the inner edge 24, and reference sign PO stands for the axial distance between the end portion of the filtering mesh 22 which is the farthest from the central axis X and the closest edge of the passage 32 of the outer edge 26.

Since the filtering mesh 22 has a conical shape, the respective distances PI and PO between the filtering mesh 22 and the passages 30, 32 are increased with respect to that in filter elements wherein the filtering mesh is plane. Thus, the filtering mesh 22 is better held by the inner and outer edges 24, 26. This may even enable to increase the axial dimension of the passages 30, 32, so as to configure the filter element 10 to process greater flow rates.

In the present embodiment, the filtering mesh 22 is inserted in the inner edge 24 at a location situated between 40% and 60% of the axial thickness EI of the inner edge 24 at a passage 30. In other words, the ratio PI/EI is between 40% and 60%.

Likewise, the filtering mesh 22 is inserted in the outer edge 26 at a location situated between 40% and 60% of the axial thickness EO of the outer edge 26 at a passage 32. In other words, the ratio PO/EO is between 40% and 60%.

Since the filtering mesh 22 is tightly held by the inner and outer edges 24, 26, it is possible to make the radial ribs 28 and the reinforcing ribs 40 thinner than in prior art filter elements, and not to connect a reinforcing rib 40 to the inner edge 24. In addition, the proposed arrangement of the reinforcing ribs 40 including an inclined portion 42a, 42b, minimizes the surface of the filtering mesh 22 which is not available for filtering. Thus, in the filter 100 according to the embodiment, the ratio of the filtering mesh surface available for filtering to the total filtering mesh surface is at least 75%.

Figure 7:
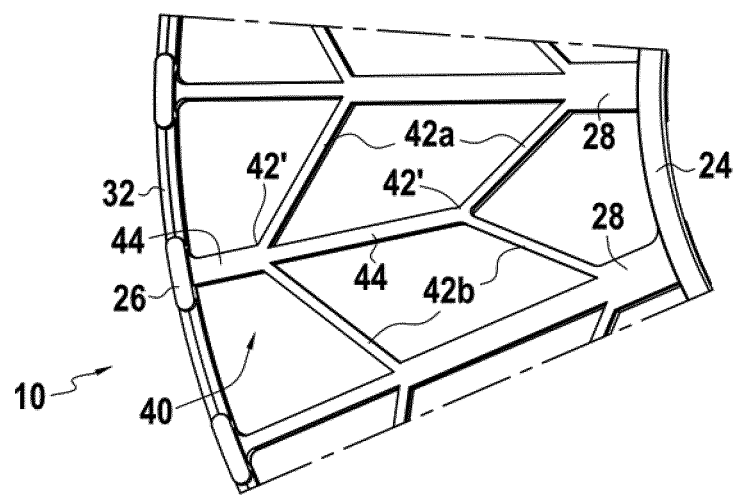
FIG. 7 is a partial perspective view of a filter element according to a second embodiment.

Another embodiment of a filter element 10 will now be presented with reference to FIG. 7. In this figure, the elements corresponding to or identical with those of the first embodiment will receive the same reference sign and will not be described again. The reinforcing rib 40 comprises two first inclined portions 42a, two second inclined portions 42b and two radial portions 44. One first inclined portion 42a and one second inclined portion 42b are connected to one radial portion 44 as previously described, e.g. in the general form of a Y. Another first inclined portion 42a and another second inclined portion 42b are connected to form of a Y. The two radial portions 44 are connected to each other so as to be aligned in the radial direction. In other words, the reinforcing rib comprises two connecting portions, each having two branches respectively formed by the first and the second inclined portions 42 a and 42b, and two radial portions 44 respectively extending from the outer edge to the joining zone 42' of the branches of the radially outer connecting portion, and from said joining zone and the joining zone of the branches of the radially inner connecting portion. Accordingly, the reinforcing rib 40 substantially has the general shape of two Y's, one above the other, or the general shape of a fishbone.

The two first inclined portions 42a do not have the same inclination angle with respect to the outer edge 26 (e.g., the angle β shown in FIG. 2) and to the radial ribs 28 (e.g., the angle θ shown in FIG. 3). Their respective inclinations are determined such that the reinforcing rib 40 divides the filtering mesh surface of the sector in substantially equal areas.

Figure 11A:
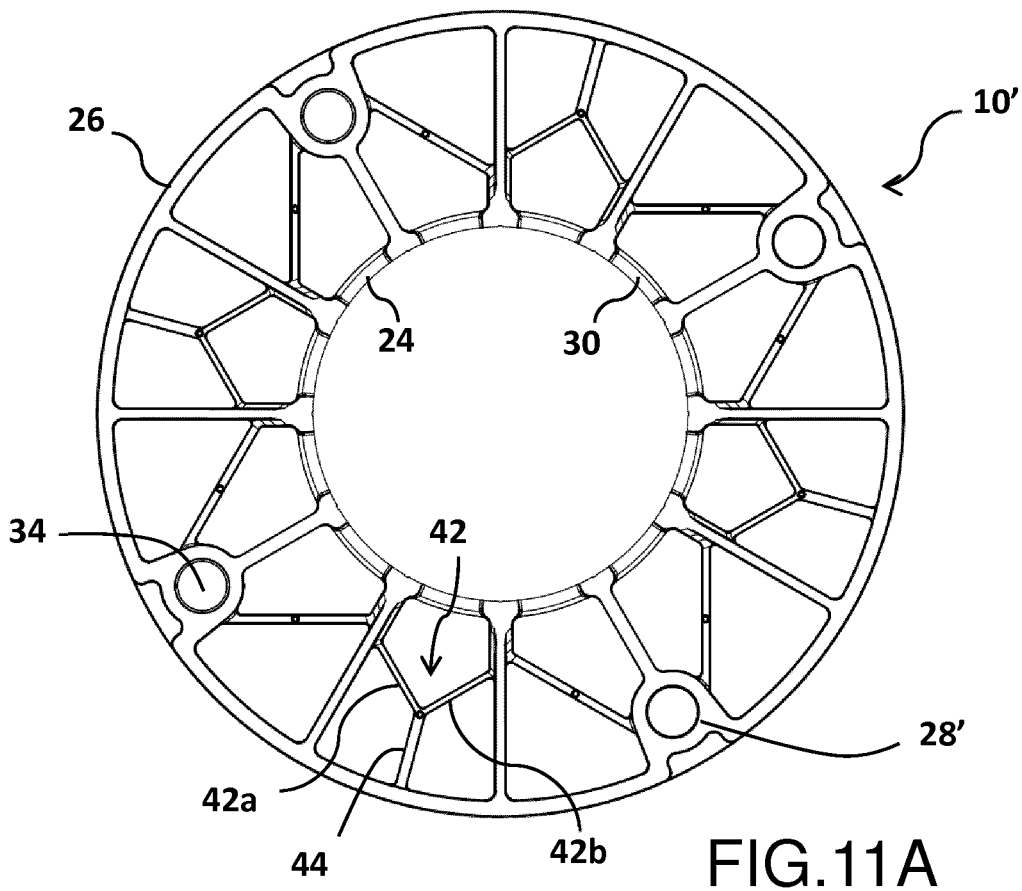
FIGS. 11A and 11B include a top view and a partial top view of a filter element according to a fourth embodiment.
Figure 11B:
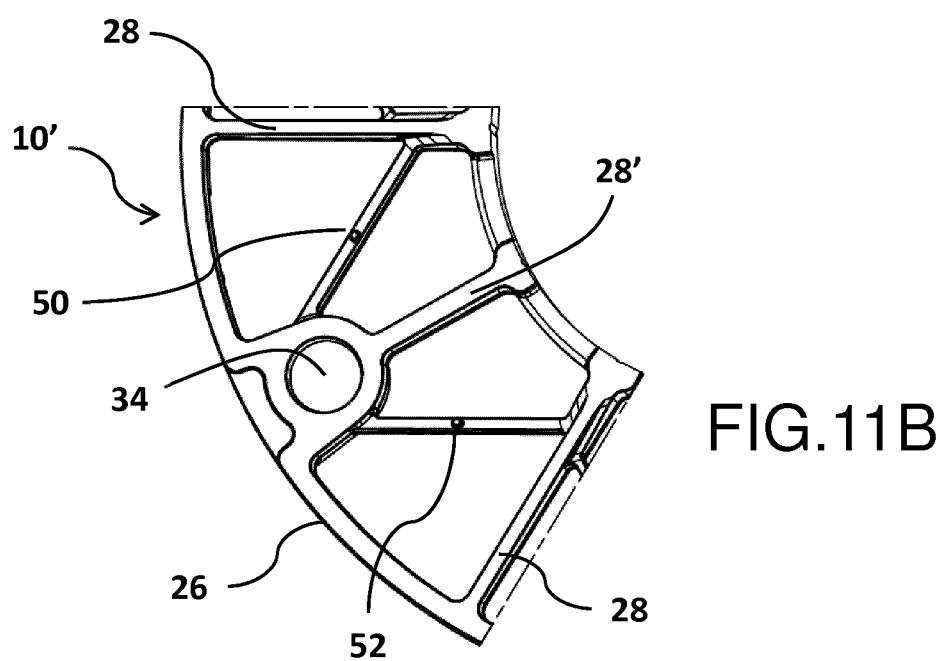

In FIGS. 11A and 11B, there is shown a further embodiment of a filter element 10'. In this embodiment, the filter element 10' comprises a number of sectors provided with at least one reinforcing rib 40 connecting a radial rib 28 to the outer edge 26. Said reinforcing rib 40 has a portion that is inclined, when viewed in the radial plane in which the outer edge 26 extends, with respect to the radial rib 28' and to the outer edge 26. As for the embodiment described above in relation to FIGS. 1 and 2, the reinforcing rib 40 has first and second inclined portions 42a, 42b and a radial portion 44. The first and second inclined portions 42a, 42b are respectively connected to the radial ribs 28 defining the sector, and to the radial portion 44. The radial portion 44 is connected to the outer edge 26. Thus, these sectors and the reinforcing ribs thereof are similar to those described above and reference is made thereto for further description.

However, the embodiment of FIGS. 11A and 11B also comprises a number of sectors where the reinforcing ribs 50, 52 are not connected to the outer edge 26. Instead, reinforcing ribs 50, 52 are connected between two radial ribs 28 and the intermediate radial rib 28' being provided with a hole 34 for passing for passing an assembly rod therethrough. Here, the reinforcing ribs 50, 52 are connected to opposite sides of the radial rib 28' at the location of the hole 34.

Figure 9:
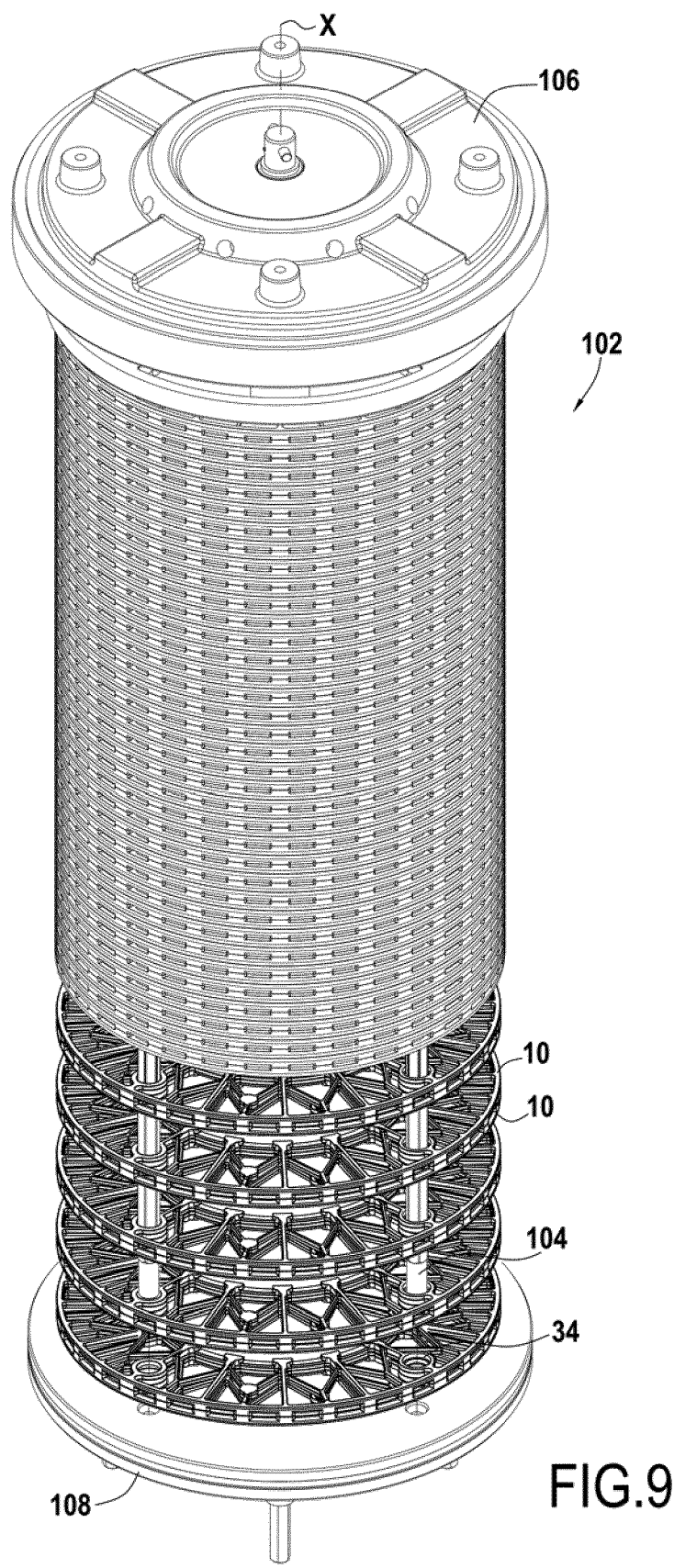
FIG. 9 is a exploded perspective view of a stack of filter elements.

FIG. 9 illustrates a stack 102 comprising a plurality of filter elements stacked along an axis X and arranged between an upper cover 106 and a lower cover 108. Filter elements 10 are assembled in pairs with respective identical, similar or complementary filter elements 10, as previously described. In each pair, filter elements 10 are arranged one against the other, so that their respective internal faces 20 face each other and the contacting radial ribs 28 of said respective internal faces 20 partition the space between said internal faces 20.

Assembly rods 104 are inserted in the holes 34 of the filter elements 10, thereby ensuring alignment and axial correspondence of the filter elements 10.

Figure 10:
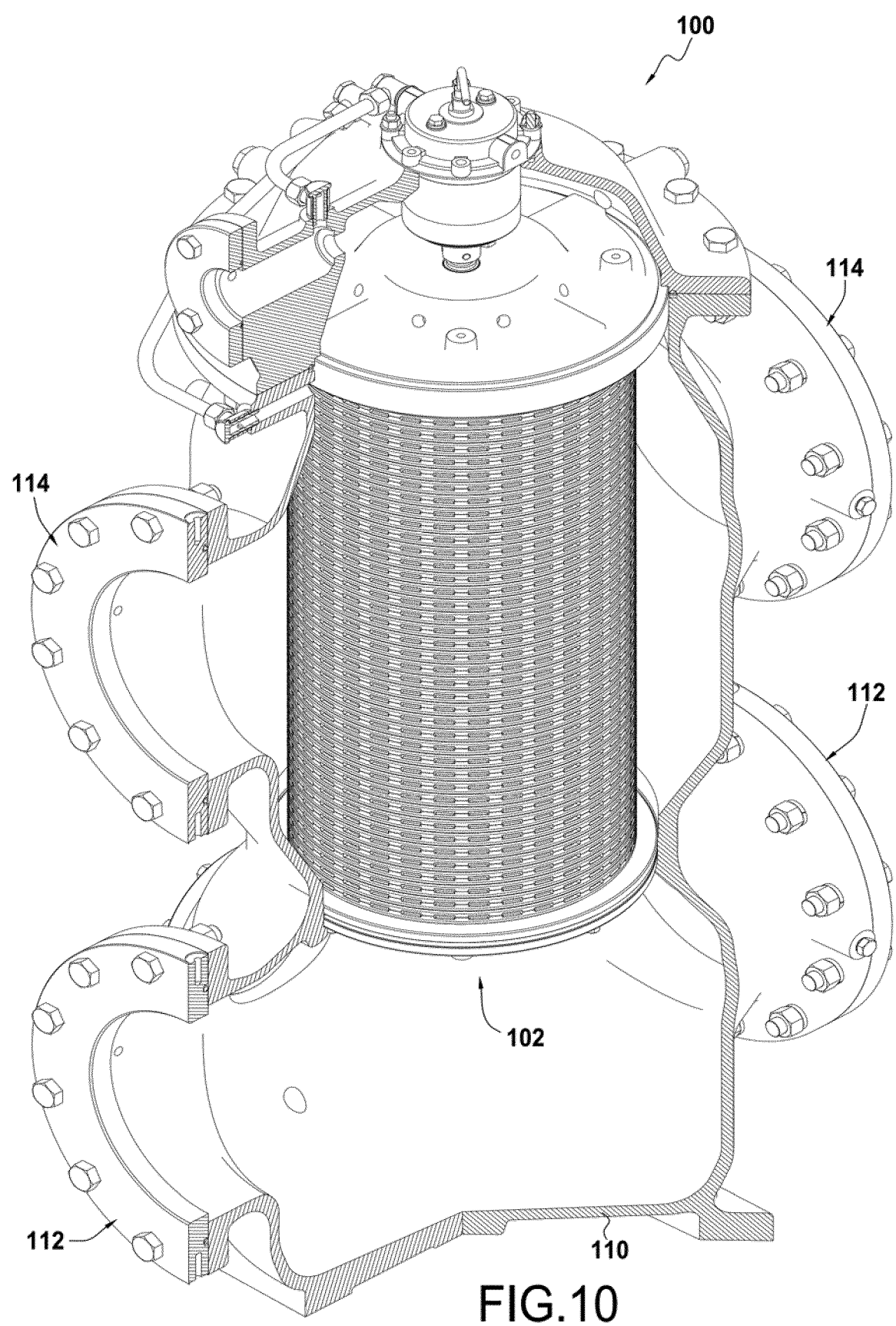
FIG. 10 is a perspective view of a filter comprising a plurality of filter elements.

A filter 100 is shown in perspective in FIG. 10. The filter 100 comprises a carter 110 and a stack 102 of filter elements is arranged within the carter 110. Thus, the filter 100 comprises a plurality of filter elements 10, said filter elements being stacked along the axis X.

The filter 100 comprises two inlet portions 112 and two outlet portions 114. The filter 100 may comprise one or more inlet portions 112, and/or one or more outlet portions 114. In this embodiment, the inlet portions 112 are fluidly connected to the passages 30 of the inner edges 24 of the filter elements 10, while the outlet portions 114 are fluidly connected to the passages 32 of the outer edges 26. However, the flow direction within the carter 110 and the stack 102 may be reversed.

The stack 102 of filter elements is fastened to the carter 110 in a conventional manner.

Although the present invention has been described by referring to specific exemplary embodiments, modifications may be provided to these examples without the departing from the general scope of the invention as defined by the claims. In particular, individual characteristics of the different illustrated/mentioned embodiments may be combined in additional embodiments. Therefore, the description and the drawings should be considered in an illustrative rather than in a restrictive sense.

The invention claimed is:

1. A filter element comprising:
    an internal face; an external face;
    a filtering mesh including a filtering mesh surface available for filtering;
    two concentric circular edges, respectively an inner edge and an outer edge between which the filtering mesh extends; and
    radial ribs provided at least on the internal face, the radial ribs extending between the concentric edges and being distributed circumferentially in order to form sectors on the internal face,
    wherein the filter element is configured to be assembled against a corresponding filter element so that the internal face faces the corresponding filter element and the radial ribs delimiting the sectors act to circumferentially form compartments in a space between the internal face and the corresponding filter element, the inner edge having passages respectively communicating with corresponding ones of the sectors,
    wherein at least some of the sectors are each provided with at least one reinforcing rib connecting a radial rib to the outer edge, and the reinforcing rib has an inclined portion that, when viewed in a radial plane, forms a non-zero angle with respect to the radial rib and with respect to the outer edge,
    wherein the reinforcing rib includes a radial portion extending in a radial direction and having a first end connected to the outer edge at a position between two adjacent radial ribs, and the inclined portion is inclined with respect to the radial portion and connects between a second end of the radial portion and the radial rib, thereby forming the non-zero angle with respect to the radial rib and the outer edge respectively,
    wherein a distance between the radial rib and the inclined portion of the reinforcing rib, measured in the circumferential direction, increases towards the outer edge, and
    wherein a connection zone where the inclined portion connects the radial rib is radially closer to the inner edge than a joining zone where the inclined portion connects the radial portion.

2. The filter element as claimed in claim 1, wherein when viewed in the radial plane in which the outer edge extends, the inclined portion and the radial rib form an angle greater than 5°, and less than 85°.

3. The filter element as claimed in claim 1, wherein the reinforcing rib comprises a connecting portion connecting the two consecutive radial ribs delimiting the sector in which the reinforcing rib is formed, the connecting portion having two branches, each connected to one of the two consecutive radial ribs at a connection zone, the branches joining up at a joining zone.

4. The filter element as claimed in claim 3, wherein the connecting portion has the general shape of a V or a U.

5. The filter element as claimed in claim 3, wherein the reinforcing rib comprises a first connecting portion and a second connecting portion, each having two branches, each branch being connected to one of the two consecutive radial ribs, and two radial portions, the first radial portion extending between the outer edge and the joining zone of the branches of the first connecting portion, and the second radial portion extending between the joining zone of the branches of the first connecting portion and the joining zone of the branches of the second connecting portion.

6. The filter element as claimed in claim 1, wherein the reinforcing rib has the general shape of a Y.

7. The filter element as claimed in claim 1, wherein the reinforcing rib is connected to the outer edge next to a fluid passage thereof in the circumferential direction.

8. The filter element as claimed in claim 1, wherein reinforcing ribs extending on either sides of one of the radial ribs are connected to the one radial rib at different locations in the radial direction.

9. The filter element as claimed in claim 1, wherein the filtering mesh has a conical shape.

10. The filter element as claimed in claim 1, wherein the filtering mesh is secured to the inner edge at a location situated between 40% and 60% of the axial thickness of the inner edge at a passage.

11. The filter element as claimed in claim 1, wherein the reinforcing rib divides the filtering mesh surface of the sector in areas of substantially similar size.

12. The filter element as claimed in claim 1, wherein a ratio of the filtering mesh surface available for filtering, which is not covered by the radial ribs and reinforcing rib, to a total filtering mesh surface is at least 70%.

13. The filter element as claimed in claim 1, wherein radial ribs are further provided on the external face, the radial ribs extending between the concentric edges and being regularly distributed circumferentially in order to form sectors on the external face, and wherein the radial ribs on the internal face are in axial correspondence with the radial ribs on the external face.

14. The filter element as claimed in claim 1, wherein the radial ribs and/or the reinforcing rib are made of polymer.

15. The filter element as claimed in claim 1, wherein the filtering mesh is free of supporting mesh.

16. A pair of filter elements as claimed in claim 1, arranged one against the other, so that their respective internal faces face each other and the contacting radial ribs of the respective internal faces partition the space between the internal faces.

17. A filter comprising a plurality of filter elements as claimed in claim 1, the filter elements being stacked along an axis.

18. The filter element as claimed in claim 1, wherein when viewed in the radial plane in which the outer edge extends, the inclined portion and the radial rib form an angle greater than 10° and less than 70°.

* * * * *